United States Patent
Mendis et al.

(10) Patent No.: US 7,034,873 B2
(45) Date of Patent: Apr. 25, 2006

(54) PIXEL DEFECT CORRECTION IN A CMOS ACTIVE PIXEL IMAGE SENSOR

(75) Inventors: Sunetra K. Mendis, Palo Alto, CA (US); Tzi-Hsiung Shu, San Jose, CA (US)

(73) Assignee: Vanguard International Semiconductor Corporation, Hsin-Cu (TW)

( * ) Notice: Subject to any disclaimer, the term of this patent is extended or adjusted under 35 U.S.C. 154(b) by 733 days.

(21) Appl. No.: 09/896,426

(22) Filed: Jun. 29, 2001

(65) Prior Publication Data

US 2005/0030394 A1   Feb. 10, 2005

(51) Int. Cl.
*H04N 9/64* (2006.01)
(52) U.S. Cl. .................................... 348/246
(58) Field of Classification Search ............... 348/246, 348/247
See application file for complete search history.

(56) References Cited

U.S. PATENT DOCUMENTS

| | | | |
|---|---|---|---|
| 4,899,205 A * | 2/1990 | Hamdy et al. ............ 257/530 |
| 5,528,043 A | 6/1996 | Spivey et al. ........... 250/370.09 |
| 5,886,353 A | 3/1999 | Spivey et al. ........... 250/370.09 |
| 6,002,433 A * | 12/1999 | Watanabe et al. .......... 348/246 |
| 6,252,293 B1 * | 6/2001 | Seyyedy et al. ............ 257/530 |
| 6,526,366 B1 * | 2/2003 | Dunton ...................... 702/116 |
| 6,611,288 B1 * | 8/2003 | Fossum et al. ............. 348/246 |
| 6,618,084 B1 * | 9/2003 | Rambaldi et al. ........... 348/247 |
| 6,665,009 B1 * | 12/2003 | Dong ......................... 348/246 |
| 6,724,945 B1 * | 4/2004 | Yen et al. ................... 382/274 |
| 2001/0052939 A1 * | 12/2001 | Riedel ........................ 348/294 |
| 2002/0145507 A1 * | 10/2002 | Foster ........................ 340/5.53 |

* cited by examiner

*Primary Examiner*—Ngoc-Yen Vu
*Assistant Examiner*—Gary C. Vieaux
(74) *Attorney, Agent, or Firm*—George O. Saile; Stephen B. Ackerman

(57) ABSTRACT

Effectively defect free images are obtained from CMOS image sensors through a two step method in which the addresses of bad pixels are recorded during sensor testing and stored in an on-chip directory. Then, during sensor readout, each pixel address is checked to determine if it represents that of a bad pixel. If this is determined to be the case, the bad pixel value is replaced by another value. This replacement value is generated from an average of the nearest-neighbors that are not defective. If testing is performed at the wafer level, said bad pixel and nearest neighbor data may be used to modify the final level wiring so that bad pixels are disconnected and replaced by their nearest neighbors.

3 Claims, 1 Drawing Sheet

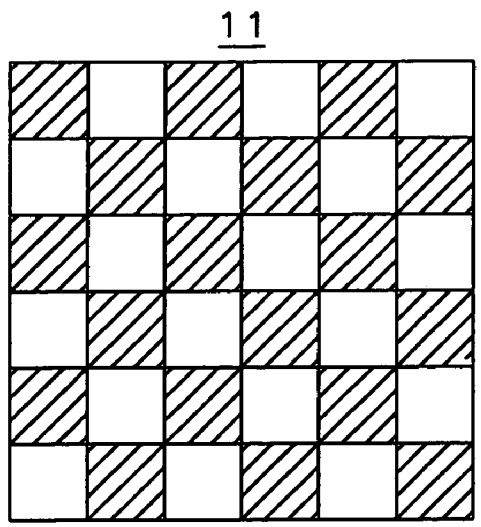
*FIG. 1 - Prior Art*
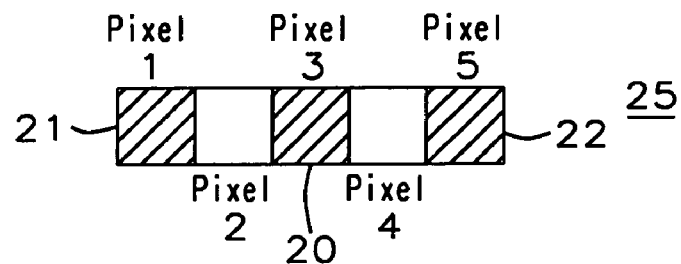
*FIG. 2*
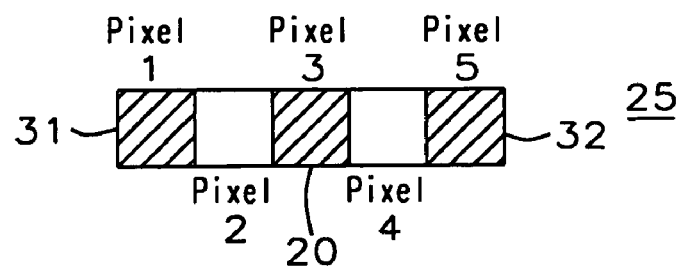
*FIG. 3*

PIXEL DEFECT CORRECTION IN A CMOS ACTIVE PIXEL IMAGE SENSOR

FIELD OF THE INVENTION

The invention relates to the general field of color imaging with particular reference to permanently correcting the handling of bad pixels.

BACKGROUND OF THE INVENTION

A CMOS image sensor consists of an array of Field Effect transistors, each of which acts as a pixel, together with various support circuits for driving and reading out the signal. A bad pixel is defined as a pixel whose response is noticeably different from the response of the other pixels in the array under dark or uniformly illuminated conditions. Pixel defects can be caused for many reasons including high leakage, circuit defects, dust particles, scratches, color filter nonuniformity, or microlens defects. The two extremes for such defects are: dead pixels, which are always dark, and hot pixels which are always saturated. No matter their origin, bad pixels degrade image quality because even one defective pixel can stand out in an image made up of millions of good pixels.

Color interpolation, sharpening and other software-based image processing operations are often used to neutralize the effects of bad pixels but these can actually further degrade image quality by corrupting good pixels that are the neighbors of a bad pixel. Additionally, a bad pixel introduces high frequency components to an image which impacts the compression ratio.

Another method of dealing with defective pixels involves the use of two exposures in succession with a small diagonal shift of the entire sensor of 10 to 20 pixels between the two exposures. The computer then combines the two exposures into a single image which will have very few missing pixels. For further accuracy, this method can be extended to three successive exposures with diagonal shifts of the sensor between each exposure.

Although it is highly desirable to have an image sensor that is entirely defect-free, selecting arrays having only good sensors with not a single bad pixel is not a viable alternative as it would drive down manufacturing yield and significantly increase cost. The present invention teaches how image sensors may be made to be effectively defect-free by detecting, and then correcting for, the bad pixels. An approach of this type carries with it the additional benefit of making arrays, that might otherwise have been rejected after testing, useable.

A routine search of the prior art was performed but no references that teach the exact processes and structures of the present invention were discovered. Several references of interest were, however, encountered along the way. For example, in U.S. Pat. No. 5,528,043 and U.S. Pat. No. 5,886,353, Spivey, et al. both describe an imaging system for producing images from electromagnetic radiation such as x-rays. Their system includes a detector comprised of a radiation-absorbing layer sandwiched between an array of CMOS integrated circuits (pixel circuits) and a surface electrode layer transparent to the radiation. Each of the pixel circuits in the array has a charge-collecting electrode. An external voltage applied between the surface electrode layer and the charge collecting electrodes produces an electric field across the thickness of the absorbing layer pixels and even missing rows or columns are corrected by having the computer assign values to the missing pixels by interpolation between the values of the neighboring pixels.

SUMMARY OF THE INVENTION

It has been an object of the present invention to provide a method for correcting bad pixels in a CMOS image sensor array.

Another object of the invention has been that said method require only a single exposure of the image that is being sensed at the time the bad pixels are corrected.

A further object of the invention has been that said method be easy to implement and not significantly impact current manufacturing processes for making said sensors.

These objects have been achieved by a two step method in which the addresses of bad pixels are recorded during sensor testing and stored in an on-chip directory. Then, during sensor readout, each pixel address is checked to determine if it represents that of a bad pixel. If this is determined to be the case, the bad pixel value is replaced by another value. This replacement value can be generated from an average of the nearest-neighbors that are not defective.

BRIEF DESCRIPTION OF THE DRAWINGS

FIG. 1 is a schematic representation of a Bayer pattern color mosaic.

FIG. 2 illustrates how two nearest neighbors may be used to correct a bad pixel.

FIG. 3 illustrates the case when one of the nearest neighbors is itself defective.

DESCRIPTION OF THE PREFERRED EMBODIMENTS

The method of the present invention may be divided into two principal steps. The first step is to record the addresses of bad pixels during sensor testing, both with and without illumination. These addresses are permanently stored on-chip (for example, by means of fusible link technology, anti-fuse technology, or flash memory technology). The second step is implemented during sensor readout. Each pixel address is checked to determine if it represents that of a bad pixel. If this is determined to be the case, the bad pixel value is replaced by another value. This replacement value is generated from an average of the nearest-neighbors that are not defective. All these operations are easily integrated with the CMOS image sensor hardware on the same IC chip.

In a monochromatic sensor, nearest neighbors would also be immediate neighbors but, in a color sensor, the replacement value will necessarily be generated from other pixels that are the same color as the bad pixel. To illustrate the method of the present invention, a color sensor 11 with a Bayer pattern color mosaic—blue-green, green-red (BG, GR) is shown in FIG. 1. A Bayer pattern is a particular assignment of color patterns in a two dimensional color filter array. A typical example of a unit pattern for a Bayer pattern is a 2×2 array in which the upper left cell is blue (B), upper right cell is green (G), lower left cell is green (G), and lower right cell is red (R), hence the (BG, GR) designation. The Bayer pattern is constructed from the repetition of the unit pattern. The pixel defect correction algorithm can be simplified by using only pixels in the same row to generate the replacement value. As each row contains only two colors (in this example), a 5-pixel buffer 25 is sufficient for implementing the correction scheme (see FIG. 2). This points to the bad pixel 20 and its nearest neighbor replacements 21 and 22. If one of the same-color nearest neighbors 31 (see FIG. 3) is also a bad pixel, the replacement value becomes the remaining same-color nearest neighbor 32. If both same-color nearest neighbors are also bad, the bad pixel cannot be corrected (unless a larger buffer is used). Alternatively, if pixel outputs from multiple rows are stored, pixel correction based on two-dimensional calculation can be implemented.

Therefore, this algorithm, implemented on a color sensor with a Bayer mosaic, can correct up to 4 consecutive bad pixels in a row (in this example). The number of bad pixels in a column or diagonal is limited only by the number of bad pixel addresses that can be stored. Once a bad pixel has been identified, a flag can be generated which can then be used in association with specially provided on-chip circuitry, by a companion ASIC, or by the host computer to locate the bad pixel and replace it with a different (corrected) value. An even better estimate could be generated from the values of all the nearest-neighbors, including those in different rows, if the time and space for doing so are available.

In place of the all-softwre approach described above it is also possible to improve pixel arrays as follows: After testing the pixel array to determine where bad pixels are located, these bad pixels are disconnected from the array and then connected to one or more of their nearest neighbors so that these nearest neighbors, in combination, will serve as replacements for the bad pixels. The steps of disconnecting and then re-connecting bad pixels can be accomplished through use of fusible link or anti-fuse technology. Note that testing of the pixel array (to determine at which address a bad pixel is located) is performed prior to dicing into chips. This enables the steps of disconnecting and then reconnecting the bad pixels to be accomplished by means of chip-level wiring.

While the invention has been particularly shown and described with reference to the preferred embodiments thereof, it will be understood by those skilled in the art that various changes in form and details may be made without departing from the sprit and scope of the invention.

What is claimed is:

1. A method for improving a pixel array, comprising:
testing the pixel array to determine at which address a bad pixel is located;
disconnecting said bad pixel from the array;
connecting one or more of said bad pixel's nearest neighbors to the array at said address, whereby said nearest neighbors serve, in combination, as a replacement for said bad pixel; and
implementing the steps of disconnecting said bad pixel from, and connecting one or more nearest neighbor pixels to, the array, through use of fusible link technology.

2. A method for improving a pixel array, comprising:
testing the pixel array to determine at which address a bad pixel is located;
disconnecting said bad pixel from the array;
connecting one or more of said bad pixel's nearest neighbors to the array at said address, whereby said nearest neighbors serve, in combination, as a replacement for said bad pixel; and
implementing the steps of disconnecting said bad pixel from, and connecting one or more nearest neighbor pixels to, the array, through use of anti-fuse technology.

3. A method for improving a pixel array, comprising:
testing the pixel array to determine at which address a bad pixel is located;
disconnecting said bad pixel from the array;
connecting one or more of said bad pixel's nearest neighbors to the array at said address, whereby said nearest neighbors serve, in combination, as a replacement for said bad pixel; and
performing said testing prior to dicing into chips, thereby enabling the steps of disconnecting said bad pixel from, and connecting one or more nearest neighbor pixels to, the array to be accomplished by means of chip-level wiring.

* * * * *

UNITED STATES PATENT AND TRADEMARK OFFICE
CERTIFICATE OF CORRECTION

| | |
|---|---|
| PATENT NO. | : 7,034,873 B2 |
| APPLICATION NO. | : 09/896426 |
| DATED | : April 25, 2006 |
| INVENTOR(S) | : Sunetra K. Mendis and Tzi-Hsiung Shu |

It is certified that error appears in the above-identified patent and that said Letters Patent is hereby corrected as shown below:

On the Title page, in item (73), delete "Vanguard International Semiconductor Corporation, Hsin-Cu (TW)" and replace with - - Vanguard International Semiconductor Corporation, Hsin-Chu (TW)- -.

Signed and Sealed this

Fifteenth Day of August, 2006

JON W. DUDAS
*Director of the United States Patent and Trademark Office*